(12) United States Patent
Boutaghou et al.

(10) Patent No.: US 6,229,671 B1
(45) Date of Patent: *May 8, 2001

(54) SHOCK PADS FOR A SLIDER FOR A DATA STORAGE SYSTEM

(75) Inventors: Zine-Eddine Boutaghou, Vadnais Heights; Dallas Meyer, Burnsville; Jorge V. Hanchi, Minneapolis; Joel Limmer, Bloomington, all of MN (US)

(73) Assignee: Seagate Technology LLC, Scotts Valley, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/081,421

(22) Filed: May 19, 1998

Related U.S. Application Data
(60) Provisional application No. 60/059,464, filed on Sep. 22, 1997.

(51) Int. Cl.$^7$ ................................. G11B 21/21; G11B 5/60
(52) U.S. Cl. ...................................... 360/235.1; 360/236.3
(58) Field of Search .................................. 360/102, 103, 360/234.3, 235.1, 235.2, 235.3, 235.4, 235.5, 235.6, 235.7, 235.8, 236.4, 236.5, 236.3, 237

(56) References Cited

U.S. PATENT DOCUMENTS

| | | | |
|---|---|---|---|
| 5,067,037 | 11/1991 | Ananth et al. | 360/103 |
| 5,200,867 | 4/1993 | Albrecht et al. | 360/103 |
| 5,267,104 | 11/1993 | Albrecht et al. | 360/97.02 |
| 5,418,667 | 5/1995 | Best et al. | 360/103 |
| 5,424,888 | 6/1995 | Hendriks et al. | 360/103 |
| 5,499,149 | 3/1996 | Dovek | 360/103 |
| 5,550,691 | 8/1996 | Hamilton | 360/103 |
| 5,550,693 | 8/1996 | Hendriks et al. | 360/103 |
| 5,572,386 | 11/1996 | Ananth et al. | 660/103 |
| 5,734,519 | * 3/1998 | Fontana, Jr. et al. | 360/103 |
| 5,768,055 | * 6/1998 | Tian et al. | 360/103 |
| 5,796,551 | * 8/1998 | Samuelson | 360/103 |
| 5,841,608 | * 11/1998 | Kasamatsu et al. | 360/103 |
| 5,864,452 | * 1/1999 | Hirano et al. | 360/103 |
| 5,886,856 | * 3/1999 | Tokuyama et al. | 360/103 |

FOREIGN PATENT DOCUMENTS

| | | |
|---|---|---|
| 1-236412 | * 9/1989 | (JP) . |
| 3-125352 | * 5/1991 | (JP) . |
| 56-107363 | 8/1991 | (JP) . |
| 8-212740 | 8/1996 | (JP) . |
| 8-287440 | 11/1996 | (JP) . |

OTHER PUBLICATIONS

IEEE Transactions on Magnetics, vol. 31, No. 6, pp. 2961–2963 *Stiction Free Slider for the Smooth Surface Disc* by Y. Kasamatsu, T. Yamamoto, S. Yoneoka and Y. Mizoshita, for Fujitsu Limited, Nov. 1995.

IBM Technical Disclosure Bulletin, Burns et al, "Bumper for Gliding Heads", vol. 4, No. 4, p.3, Sep. 1961.*

* cited by examiner

*Primary Examiner*—David L. Ometz
(74) *Attorney, Agent, or Firm*—Westman, Champlin & Kelly, P.A.

(57) ABSTRACT

A data storage system including a disc for storing digital information and transducer for retrieving such information. A slider supports a transducers proximate the disc surface and includes a bearing surface generally facing the disc surface for operation of the transducer above the disc surface. The bearing includes raised bearing surfaces, and shock-absorbing pads which are spaced from a base surface and extend to an elevation aligned with or below the bearing surfaces. Shock pads are located to provide a contact interface between the slider and disc surface.

16 Claims, 10 Drawing Sheets

SHOCK PADS FOR A SLIDER FOR A DATA STORAGE SYSTEM

The present invention claims priority to Provisional Application Serial No. 60/059,464, filed Sep. 22, 1997, entitled "SHOCK PADS: A METHOD TO IMPROVE 30 SERIES SHOCK PERFORMANCE."

BACKGROUND OF THE INVENTION

The present invention relates to data storage systems. More specifically, the present invention relates to sliders of the type used in data storage systems.

Disc drives are used to store digitally encoded information. A slider supports a transducer element for operation. The slider includes an air bearing to raise the slider to fly above the disc surface via rotation of the discs for operation of the transducer elements. In a magnetic-type disc drive, it is known that improved magnetic interaction between the disc surface and the transducer element can be achieved by reducing the spacing between the slider and the disc surface. However, as the spacing between slider and disc is reduced, it becomes critical that the fly height be accurately maintained to avoid contact between the slider and disc surface.

With such close flying distance between the slider and the disc surface, the disc surface is susceptible to damage due to contact and impact between the slider and the disc surface. Contact between the slider and disc surface may be caused by vibration and shock, etc. Prior to operation of a disc drive, the slider may be supported by the disc surface. For operation, the slider takes off from and lands on the disc surface for contact starts and stops. Typically, a disc surface may include a landing zone and data zone. Data is stored in the data zone while the slider "parks" in the landing zone during non-operation. For operation, rotation of the disc supplies air flow to the bearing surface to lift the slider above the disc surface for load and unload operations. A load force is supplied to the slider to counteract the bearing lift force. The balance between the bearing lift force and load force define an equilibrium lifting force to define the fly height of the slider. During load and unload operations the force supplied to the slider may cause the slider to slam into the disc surface degrading the disc.

Sliders are fabricated on a wafer. The slider may include rough or sharp edges due to the fabrication process. When the slider contacts or slams into the disc, the rough or sharp edges may damage the disc surface. One technique used to reduce damage introduced by contact between the slider and disc surface is to "blend" the edges of the slider to limit damaging contact between the disc surface and slider. However, such processes requires precision machining techniques so that the operating characteristics (such as fly height) of the slider are not degraded.

SUMMARY OF THE INVENTION

The present invention relates to a slider including shock members adapted to provide a contact interface between a disc surface and the slider. In particular, a surface of the slider aligned with the disc surface includes shock members. The members are separate from the bearing surfaces and extend above a base of the slider to provide a desired contact interface.

The drawings are for illustration and are not necessarily drawn to scale.

DETAILED DESCRIPTION OF THE PREFERRED EMBODIMENTS

Figure 1:
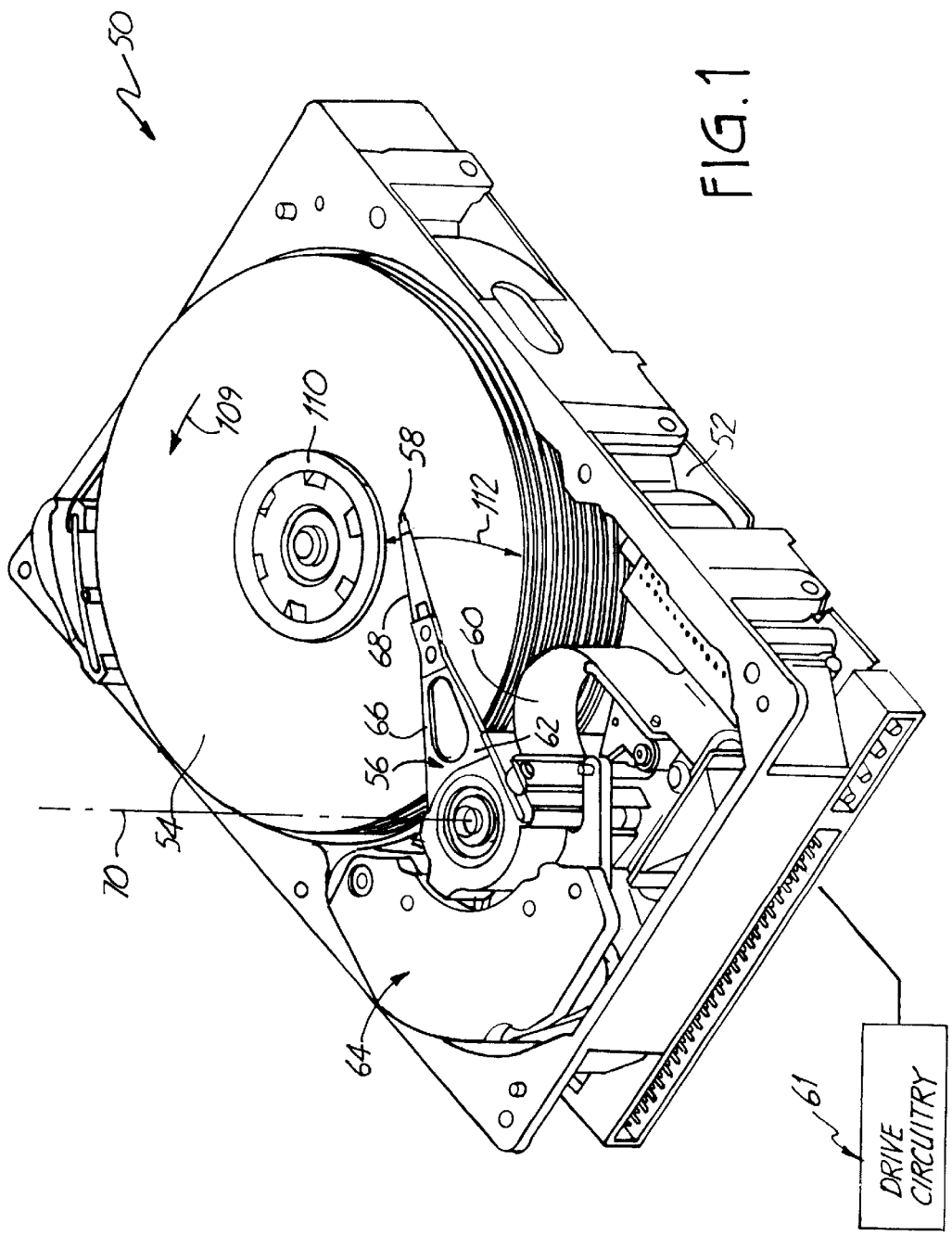
FIG. 1 is a perspective view illustrating a disc storage system.

The present invention relates to a data storage system and, in particular, has applications to a disc drive 50 for storing digital information as shown in FIG. 1. As shown, disc drive 50 includes a base 52; a disc stack 54; and rotary actuator 56, which supports heads 58 relative to surfaces of discs 54 to read and write information to and from the disc. Heads 58 are coupled to a flex circuit 60, which is coupled to circuitry 61 of the disc drive for read and write operations. In particular, the rotary actuator 56 includes an actuator block 62 and a voice coil motor 64 for movement.

Figure 2:
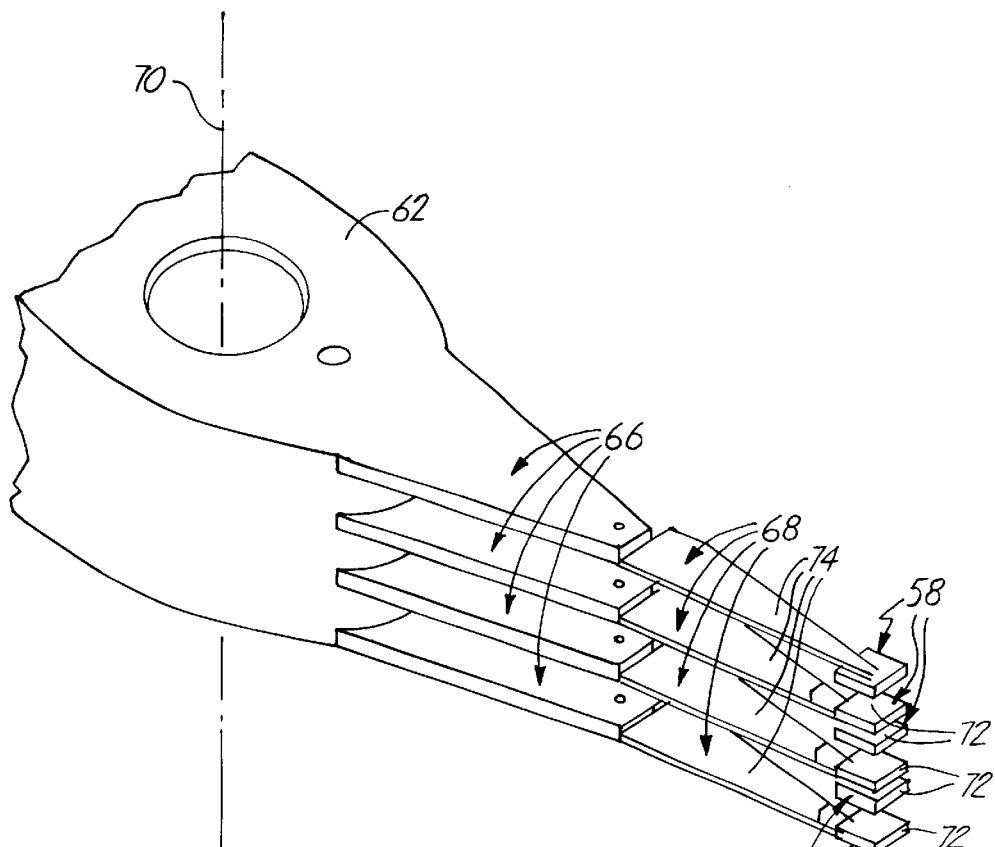
FIG. 2 is a perspective view of an actuator or E-block supporting heads for operation.

Heads 58 are supported relative to the actuator block 62 via a plurality of stacked actuator arms 66. The heads 58 are coupled to actuator arms 66 via suspension assemblies 68 in a known manner. Operation of the disc drive rotates the actuator block 62 about an axis 70 for positioning heads 58 relative to selected data tracks on the disc drive via operation of the voice coil motor 64 for read and write operations. FIG. 2 is a detailed perspective view of the actuator block 62, which illustrates heads 58 supported via suspension assemblies 68 coupled to actuator arms 66. As shown, heads 58 include a slider 72, which supports the transducer elements for read and write operations. The suspension assemblies 68 include a load beam 74 which provides a load force to the slider 72 at a load point about which the slider pitches and rolls.

Figure 4:
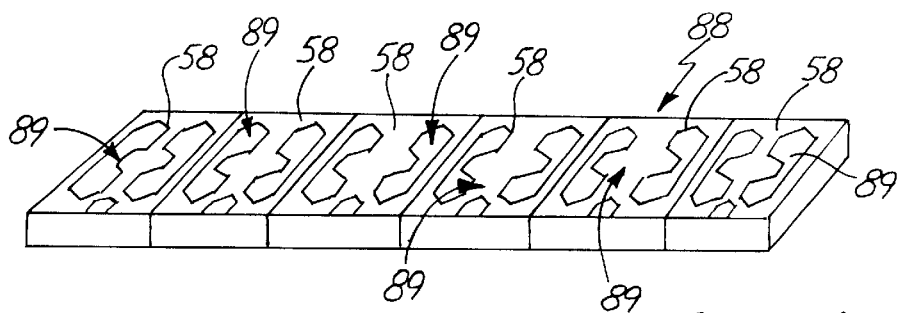
FIG. 4 is a bar of heads cut from the wafer illustrated in FIG. 3.
Figure 3:
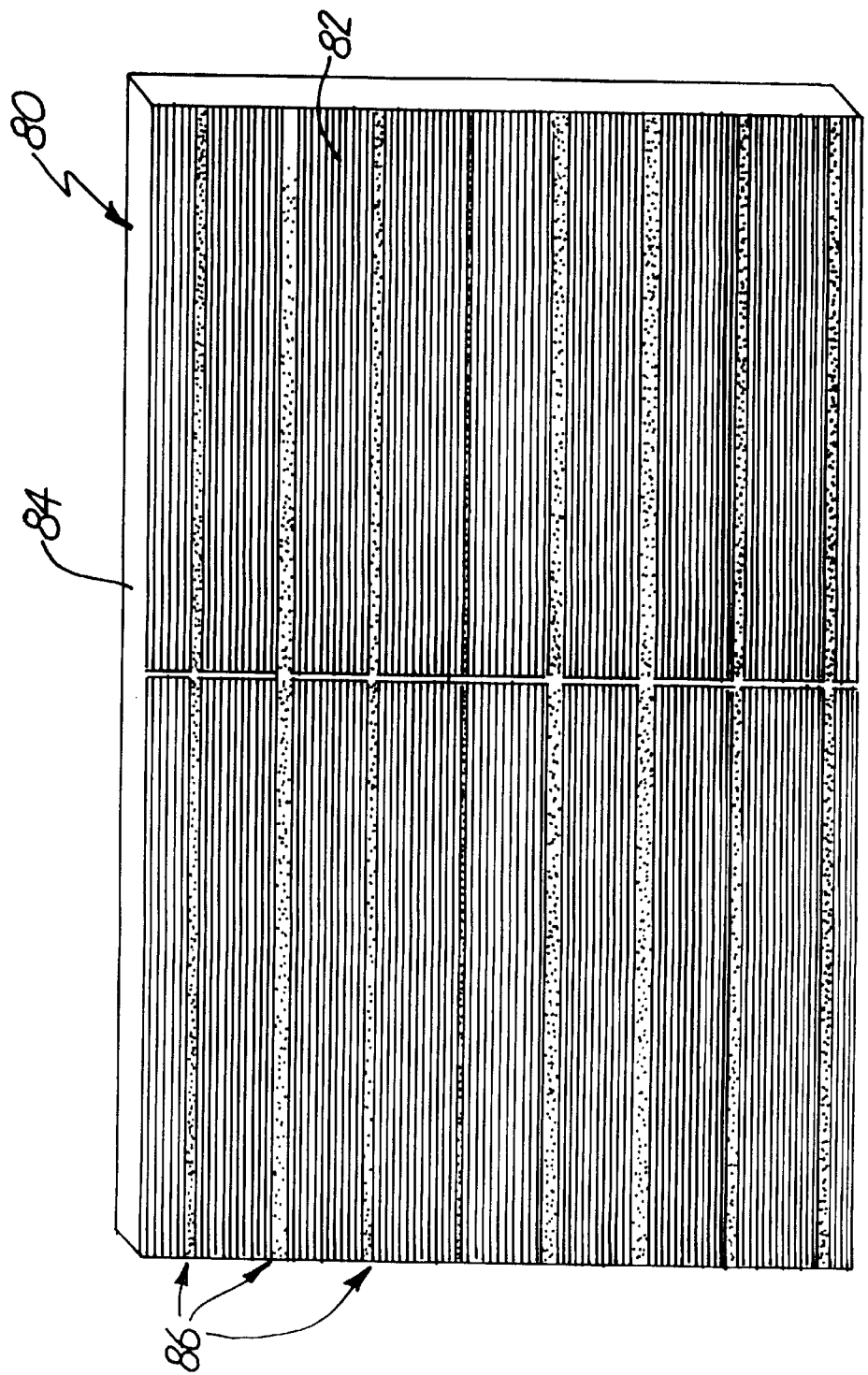
FIG. 3 is a perspective illustration of a wafer forming heads of the disc storage system.

Sliders 72 are fabricated from a wafer 80, as illustrated in FIG. 3. During the fabrication process a matrix of transducers (not shown) are applied to surface 82 of the wafer substrate 84 to form a matrix of heads which are separated for manufacture and assembly into a disc drive. Transducers may be inductive-type transducers or magnetoresistive transducers. Rows 86 of heads are sliced to form bars 88 as illustrated in FIG. 4. Individual heads 58 are sliced from bars 88.

During fabrication, air bearing 89 is formed by known techniques on a surface of the bar 88 to form air bearing sliders having transducer elements formed on an edge of the slider for operation. Techniques for forming the air bearing 89 include subtractive processes such as ion milling and etching. Bars 88 are lapped in a known manner and individual heads 58 are sliced from bars 88 for assembly in a disc drive. Formation of the air bearings 89 and slicing of the individual sliders from the wafer 80 may leave microscopic burs, sharp or rough edges which may contact and damage a disc surface during operation of a disc drive. In the manufacture of some sliders 72, slider edges are blended to reduce or eliminate the rough edges or burrs. Precision control of the blending process is necessary to maintain desired operating and fly characteristics of the slider.

Figure 5:
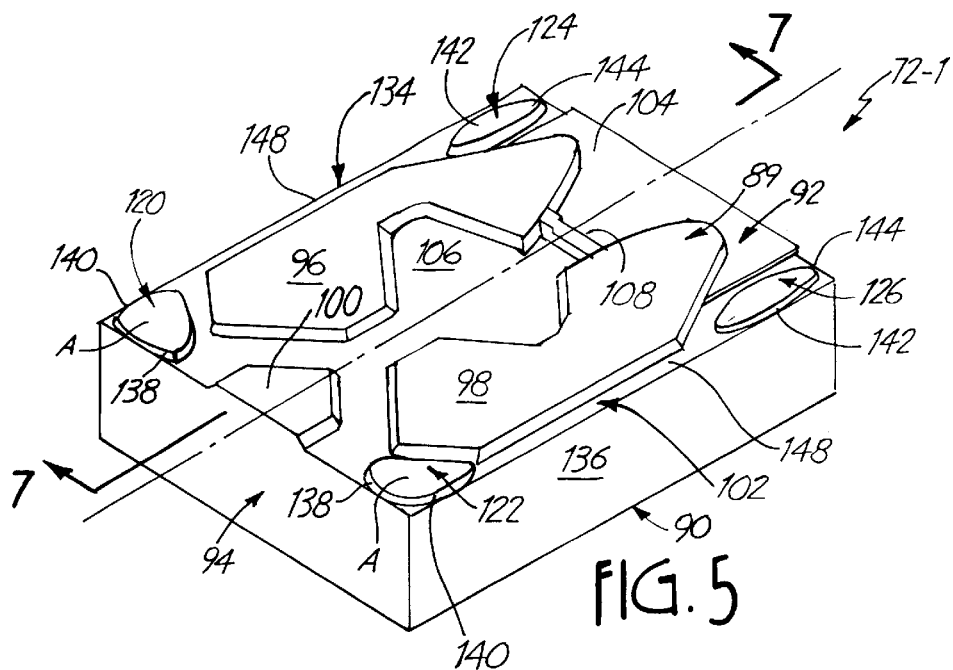
FIG. 5 is a perspective view of an embodiment of a slider supporting transducer elements.
Figure 6:
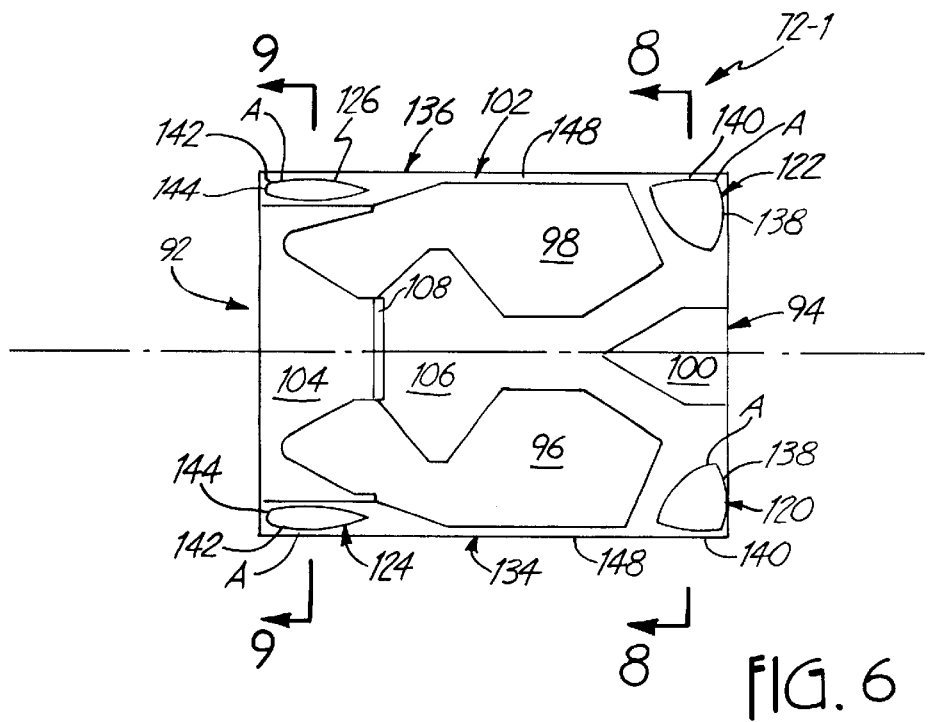
FIG. 6 is a plan view of the slider of FIG. 5.

FIG. 5 is a perspective view of an embodiment of a slider 72-1 or a head fabricated from wafer 80 or substrate, and FIG. 6 is a plan view of air bearing 89 of the slider of FIG. 5. As shown, slider 72-1 includes an upper surface 90, air bearing 89, a leading edge 92 and a trailing edge 94. The air bearing 89 includes raised side rails 96, 98, and center rail 100 extending above base 102 and forming air bearing surfaces for hydrodynamically supporting the slider 72-1 above the disc surface in a known manner.

Figure 7:
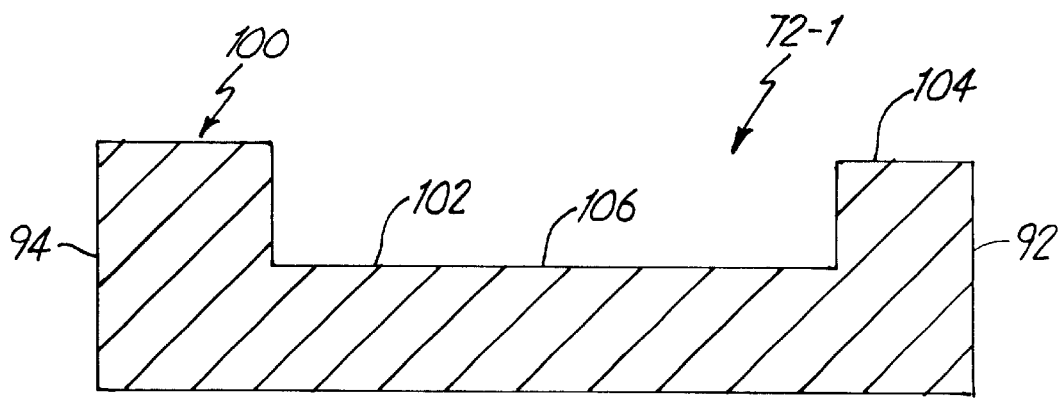
FIG. 7 is a cross-sectional view taken along line 7—7 of FIG. 5.
Figure 8:
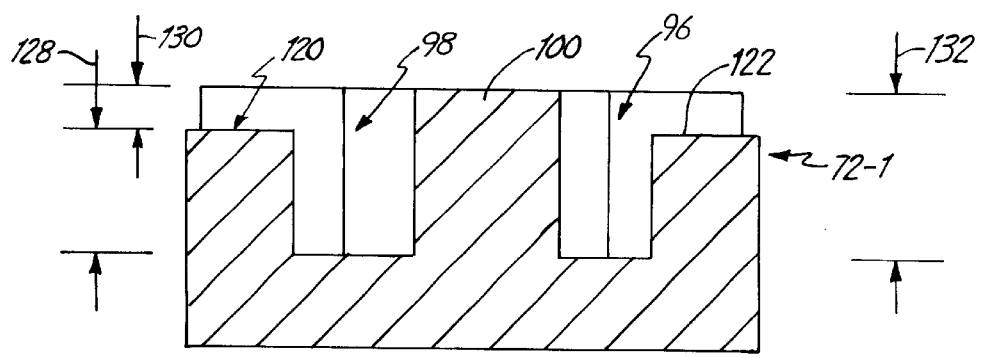
FIG. 8 is a cross-sectional view taken along line 8—8 of FIG. 6.
Figure 9:
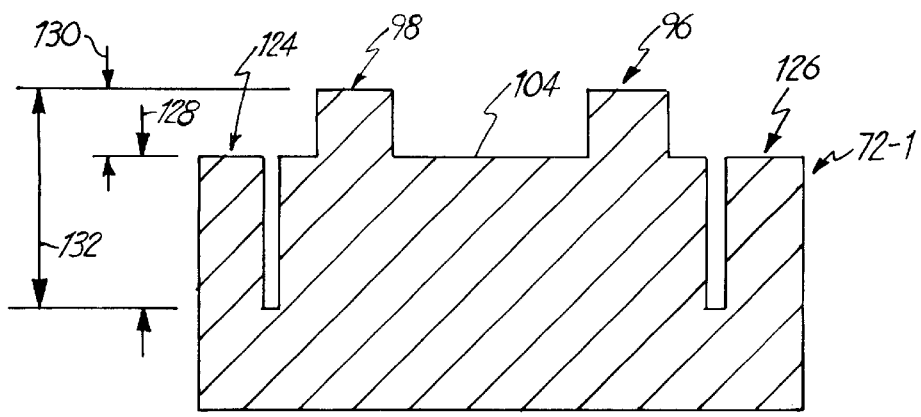
FIG. 9 is a cross-sectional view taken along line 9—9 of FIG. 6.
Figure 10:
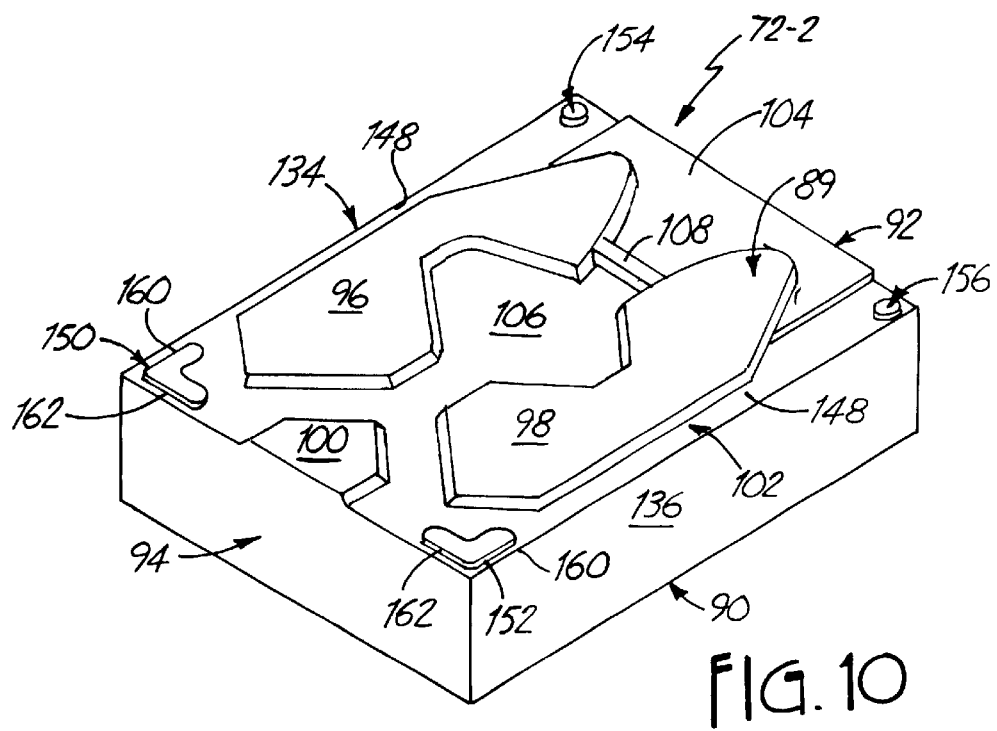
FIG. 10 is a perspective view of an alternate embodiment of a slider supporting transducer elements.

Leading edge 92 may include a stepped surface 104, spaced from base 102 and recessed from the air bearing surfaces for providing desired pressure for takeoff. The air bearing may also include dam 108 between rails 96, 98 to form a subambient pressure cavity 106 for controlling slider fly height. The shape of the bearing surfaces is formed by known masking processes on a substrate typically formed of a known substrate material. FIG. 7 is a cross-sectional view illustrating the profile of the stepped surface 104 and center rail 100 above cavity 106 or base 102. Although a particular air bearing design is shown, the invention is not limited to the particular design shown.

Slider 72 is coupled to suspension assembly 68 at the upper surface 90 so that the air bearing 89 faces the disc surface. As the disc rotates (as illustrated by arrow 109 in FIG. 1), the disc pulls a very thin layer of air and fluid beneath the air bearing 89, which develops a lifting force that causes the slider 72 to lift and fly several microinches above the disc surface. The slider 72 flies at a pitch angle, with the leading edge 92 of the slider flying at a height higher than the trailing edge 94 of the slider. Air and fluid flows from the leading edge 92 to the trailing edge 94. Skin friction on the air bearing surfaces causes air pressure to develop between the disc and the air bearing surfaces to provide lift to the slider 72 to raise the slider to fly above the disc surface for proximity recording.

Load beam 74 applies a load force to the slider 72 about which the slider pitches and rolls for operation of the disc drive in a known manner. The load force counteracts the hydrodynamic lifting force to provide an equilibrium force to define the fly height of the slider. While the disc is not in operation, the head (and slider 72) park on the disc surface in the landing zone 110 illustrated in FIG. 1.

For operation, actuator block 62 is operated along path 112 illustrated in FIG. 1 via operation of the voice coil motor 64 to position heads 58 relative to selected data tracks for read and write operations and is loaded (via load force and hydrodynamic lifting force) to fly above the disc surface for proximity recording. After operation ceases, the actuator block 62 rotates about axis 70 to position heads 58 in landing zone 110. Thereafter, disc rotation ceases and the slider 72 lift decreases to unload the slider 72 to park on the landing zone 110 of the disc surface for contact starts and stops ("CSS"). During load and unload operation, the slider may slam into the disc surface. The slider may also slam into the disk surface during operation due to large shock or vibration. Excessive contact between the slider and disc surface may damage the disc.

Exposed air bearing edges of prior sliders were blended to limit damage by contact between rough or sharp edges of the slider and disc surface. However, precision blending of the air bearing surfaces is required to maintain accurate fly characteristics. Technical studies show that contact between the slider 72 and disc surface tends to occur at the corners of the slider. To limit damage to the disc surface, the slider 72 of the present invention includes shock elements to provide a contact interface for the disc surface and the slider. Preferably, shock elements are positioned at the corners of the slider where substantial contact occurs between the slider and the disc surface.

In embodiment of the slider 72-1 illustrated in FIGS. 5–6, trailing edge shock pads 120, 122 and leading edge shock pads 124, 126 are formed at the corners of the slider 72-1. As shown in FIGS. 5–9, shock pads 120, 122, 124, 126 extend above base 102 to an elevation 128 (shown in FIGS. 8–9) to provide a contact interface between the slider 72-1 and disc surface. Preferably, the extended height of the pads is slightly recessed from or lower than the air bearing surfaces by a distance 130. The height of the pads 120, 122, 124, 126 is sufficient to provide a contact interface for the slider with the disc surface. Since the shock pads are recessed from the air bearing surfaces, the pads do not increase stiction of the slider for CSS operation. Preferably, the distance 130 is approximately 0.1–0.3 μm. Thus, the shock pads 120, 122, 124 and 126 provide a contact interface between the disc surface and the slider 72-1 during shock event or load/unload event without damage to the media or disc surface.

In the embodiment shown, the shock pads 120, 122, 124, 126 are formed of the slider substrate material and are processed to have smooth edges or surfaces to provide desired contact interface between the disc surface and the slider 72-1. Preferably, the shock pads 120, 122, 124, and 126 have slightly rounded edges for optimum contact interface. The air bearing surfaces and shock pads are formed by known subtractive masking processes. To fabricate a slider including shock pads 120, 122, 124 and 126 formed to an elevation below the air bearing surface, the air bearing surfaces are formed in one subtractive-mask process to a height 132 above base 102, and the stepped surface 104 is formed by another subtractive-mask process below the bearing surfaces. Another subtractive-mask process is used to form the shock pads 120, 122, 124, and 126 below the air bearing surfaces. Shock pads 120, 122, 124, and 126 may be blended or smoothed via known milling techniques to form smooth, preferably, rounded contact edges for interface with the disc surface. For example, shock pads 120, 122, 124 and 126 may be formed by an ion milling process to provide a shock pad having a relatively smooth external surface for contact.

In the embodiment of the slider 72-1 illustrated in FIGS. 5–6, rails 96, 98 extend along opposed sides 134, 136 of the slider 72-1. Ends of rails 96, 98 are spaced from the leading and trailing edges 92, 94 to form corners recessed from the air bearing surfaces. Shock pads 120, 122, 124 and 126 are formed at the recessed corners and are shaped to conform to the recessed portion to provide desired contact interface. Preferably, as illustrated in FIGS. 5–6, trailing edge shock pads 120, 122 have rounded end and side edges 138 and 140 which align with trailing edge and side edges 134, 136 of the slider to provide a desired contact interface between the trailing edge and side edges of the slider 72-1 and the disc surface. To assure desired contact interface, pads 120, 122 may be integrally formed with the Alumina layer of the thin film head so that edge 138 is flush with trailing edge of the slider. As shown, pads 120 and 122 are triangular in shape to contour to the shape of the recessed portion forward of rails 96, 98 in the embodiment of the slider 72-1 illustrated.

Leading edge shock pads 124 and 126 are formed of an oblong member having an elongated rounded edges 142 align with side edges 134, 136 of the slider to provide sufficient contact interference and a relatively narrow edge 144 aligned with the leading edge adjacent to stepped surface 104 for a trailing edge 92 contact interface. The area dimensions of shock pads 120, 122, 124, and 126 are sufficiently large to absorb and dampen shock contact with the disc surface. In one embodiment, the leading edge shock pads 120 and 122 may be higher or closer to ABS surface 89 than the leading edge pads 124, 126 for roll stiffness without significant effect to the take-off velocity.

Preferably, the length of edges 138 and 140 of shock pads 120, 122 is 50 $\mu$m and 100 $\mu$m, respectively and the dimension of area A is 500 $\mu$m. The length of edges 142, 144 of shock pads 124, 126 is 100 $\mu$m and 150 $\mu$m, respectively and the dimension of area A is 15,000 $\mu m^2$. However, it should be understood that the provided dimensions are preferred, and the shock pads are not limited to the specific dimensions disclosed. Although in the embodiment shown, the slider includes leading and trailing end shock pads, alternate embodiments may include either leading or trailing end shock pads, and the invention is not limited to the specific embodiments disclosed, nor the specific geometry or size shown, nor do the leading or trailing edge pads 120, 122, 124, 126 need to be similarly elevated or of similar height. In an embodiment of a slider having 1 mil edge landings 148 between side edges 134, 136 and raised bearing surfaces 96, 98, a shock pad 120, 122, 124, 126 having a height of 3.0 $\mu$m will protect from disc contact for the rough slider edges for roll in the range of 0.–6° to provide protection for reasonable shock and load/unload conditions.

Figure 11:
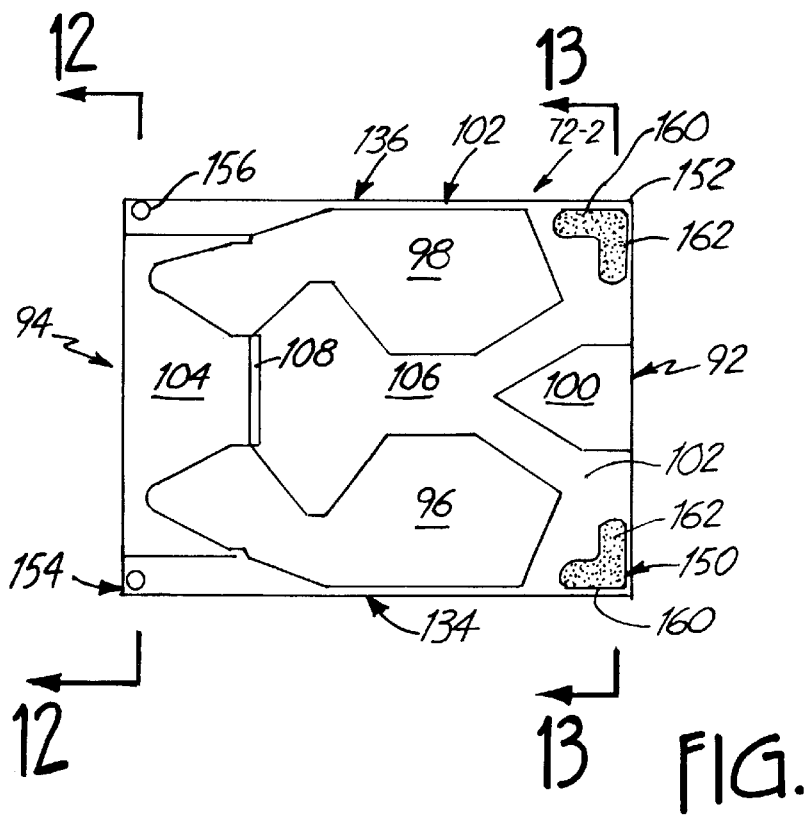
FIG. 11 is a plan view of the slider of FIG. 10.
Figure 12:
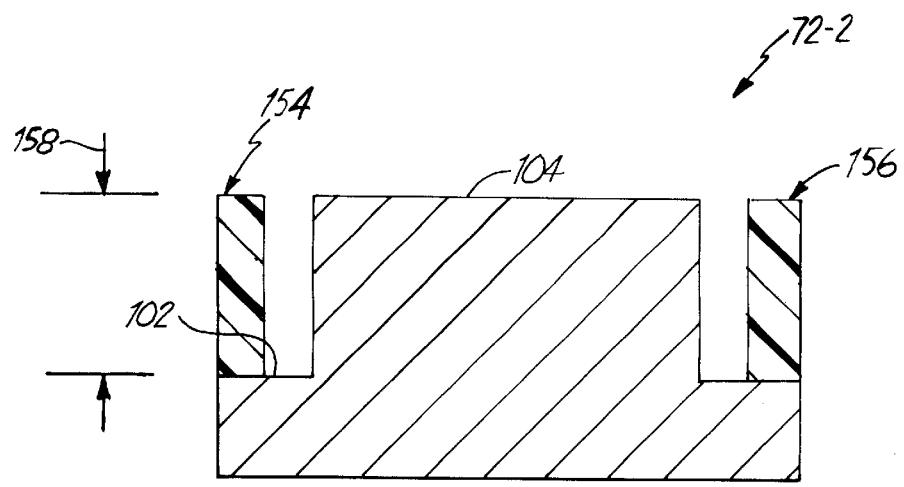
FIG. 12 is a cross-sectional view taken along line 12—12 of FIG. 11.
Figure 13:
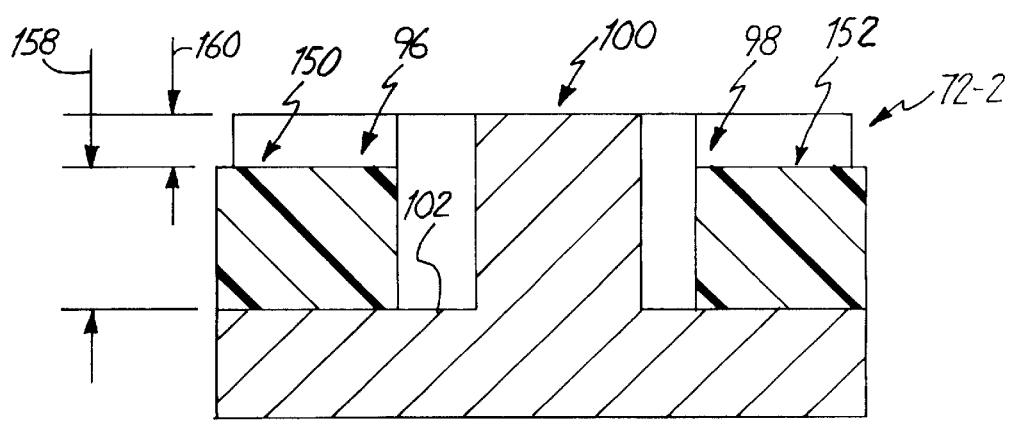
FIG. 13 is a cross-sectional view taken along line 13—13 of FIG. 11.

FIGS. 10–13 illustrate an alternate embodiment of a slider 72-2 including shock pads 150, 152, 154 and 156 where like numbers are used to refer to like parts in the previous embodiments. Preferably, as shown, shock pads 150, 152 are positioned on opposed sides at the trailing edge 92, and shock pads 154, 156 are positioned on opposed sides at the leading edge 94. Shock pads 150, 125, 154, 156 extend above base 102 to a sufficient elevation 158, as shown in FIGS. 12–13, to provide a contact interface between the slider 72-2 and disc surface during contact between the slider 72-2 and disc surface.

In the embodiment of shock pads of FIGS. 10–13, shock pads 150, 152, 154, and 156 are formed of a relatively soft energy absorbent material which dampens and absorbs impact energy for contact between the slider 72-2 with the disc surface. In particular, preferably, shock pads 150, 152, 154, 156 are formed of a polymer material which is deposited to base 102 by a deposition-mask process. As shown in FIG. 11, pads 150, 152, 154, and 156 extend to an elevation below or recessed from rails 96, 98 and 100 of the air bearing surfaces by a distance 160 to provide a contact interface surface. In the embodiment shown, pads 154, 156 are located at leading edge corners and are cylindrically shaped having a diameter of 60 $\mu$m. Pads 150, 152 are located at trailing edge corners and are generally "L" shaped to define an edge 160 aligned with opposed sides 134, 136 and edge 162 aligned with trailing edge of slider 72-2 for contact interface. Although a preferred pad 150, 152, 154, 156 shape is shown the invention is not limited to that shown.

The embodiments of the shock pads illustrated may be formed of an energy absorbent material, such as a semicrystalline polymer material. The semicrystalline material has a glass transition temperature $T_g$ since a portion of the material is amorphous. Below the $T_g$, semicrystalline polymers are hard and brittle and above the $T_g$ semicrystalline structures are flexible and rubbery. In particular, the semicrystalline material has a glass transition range between $T_{gb}$ and $T_{gf}$ transition temperature range where the material goes through a glass-rubber transition or relaxation. The more flexible "rubber" structure provides enhances energy absorption at the $T_g$.

Figure 14:
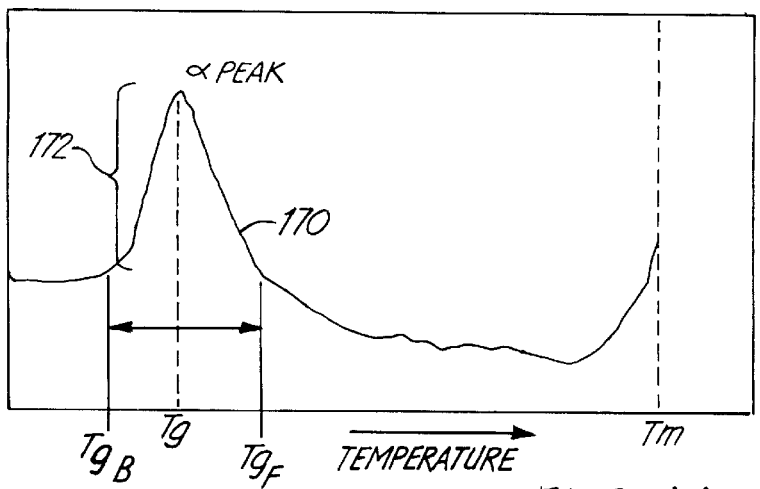
FIG. 14 is a graphical illustration of mechanical loss factor (tan $\delta$) as a function of temperature for a semicrystalline polymer at a glass transition temperature.

FIG. 14 is a graphical illustration of energy absorption at $T_g$—represented by the Mechanical Loss Factor (Tan §) for a semicrystalline polymer structure. As shown in FIG. 14, during the transition phase at $T_g$, energy absorption, as illustrated by 170, of the material spikes between $T_{gb}$ and $T_{gf}$. The magnitude of energy absorption peak 172 and temperature of $T_g$ varies based upon the composition of the semicrystalline polymer. Generally a greater percentage of amorphous material will increase the magnitude of energy absorption and a greater percentage of crystalline structure will increase the $T_g$.

Figure 15:
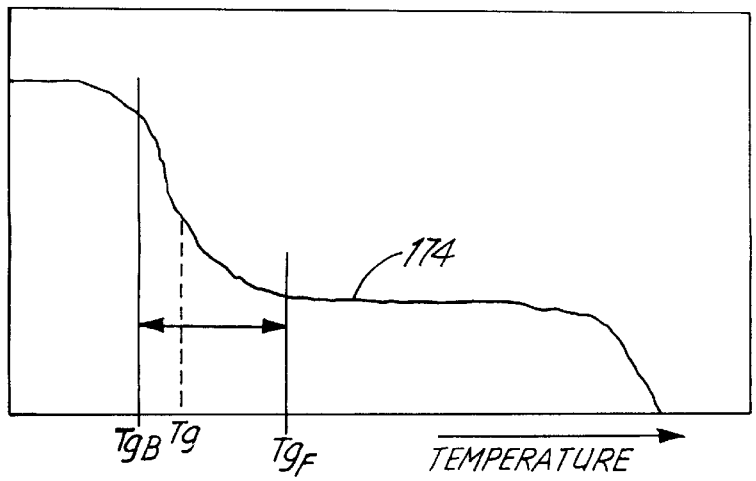
FIG. 15 is a graphical illustration of a modulus of elasticity for a material of FIG. 14 at a glass transition range.

It is desirable that the shock pads have sufficient energy absorption in the operating environment of the disc drive to dampen shock without damage to the media surface. It is also desirable that the shock pads have sufficient mechanical strength for sufficient wear and durability. FIG. 15 illustrates the modulus of elasticity 174 as a function of temperature between $T_{gb}$ and $T_{gf}$ transition temperature range. The modulus of elasticity is the relationship between stress versus strain. At $T_{gb}$ the modulus of elasticity is relatively high. As the temperature approaches $T_{gf}$, the modulus of elasticity decreases since the material is transforming to a rubbery-like composition. The modulus of elasticity provides an indication of the failure or strength of the material or pads, since a lower modulus of elasticity may significantly compress pads increasing the propensity for failure of the pads.

For operation of the shock pads it is desirable to balance energy absorption with mechanical strength (i.e. a higher modulus of elasticity). Thus it is desirable to form shock pads of a semicrystalline composition which provides high energy absorption in the operating temperature ranges of the drive and relatively high modulus of elasticity at the operating temperatures for sufficient strength and durabilty. An example semicrystalline polymer material is Parylene™ available from Specialty Coatings Systems, Inc, of Indianapolis, Ind. Parylene™ has a glass transition temperature $T_g$ of 13° C. and a melting point of 290–420° C. Parylene™ may be deposited on the slider substrate via a vapor phase deposition or other deposition techniques to form the shock pads.

Figure 16:
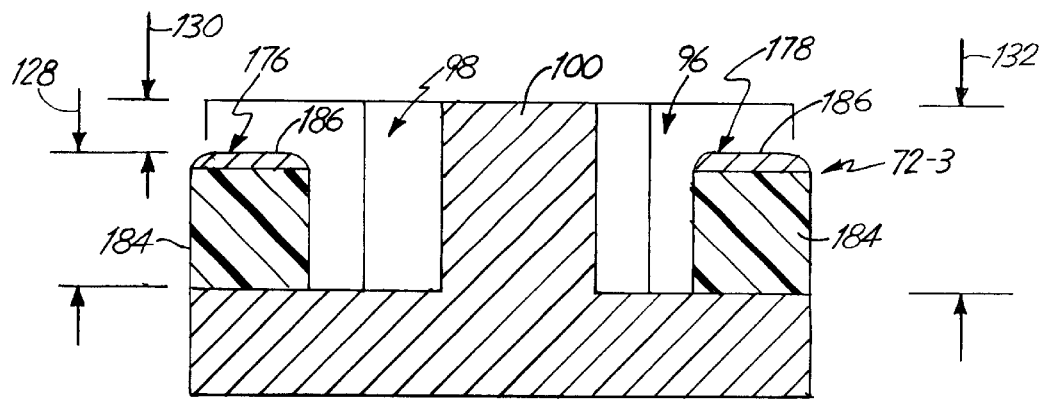
FIG. 16 is a cross-sectional view of a slider illustrating trailing edge shock pads formed of a polymer material.
Figure 17:
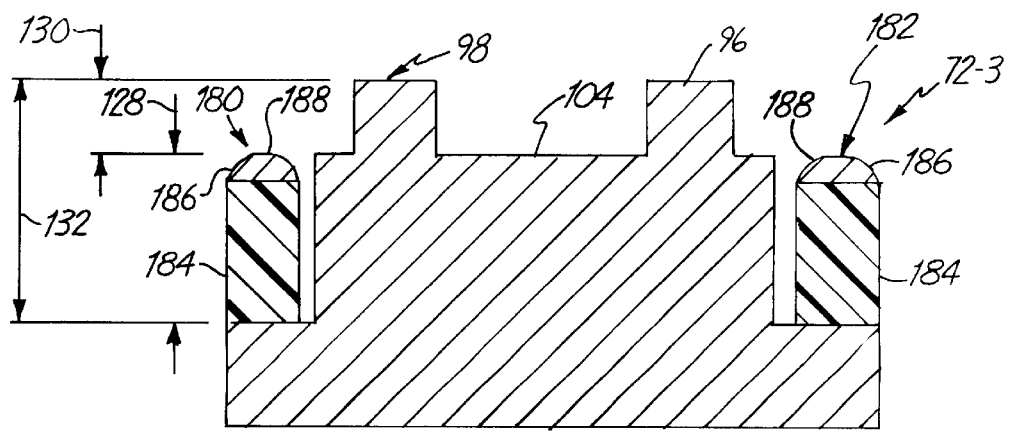
FIG. 17 is a cross-sectional view of a slider illustrating leading edge shock pads formed of a polymer material.

FIGS. 16–17 is a cross-sectional view similar to previous FIGS illustrating an alternate construction of trailing edge shock pads 176, 178 and leading edge shock pads 180, 182, respectively, formed at corners of the slider similar to that shown in the previous FIGS. As shown, shock pads 176, 178, 180, 182 are formed of a composite structure including a polymer base 184 and a relatively hard cap 186. The polymer base 184 may be formed of a semicrystalline material, such as Parylene™ or other energy absorbent material for shock absorption. The polymer base 185 extends from the slider substrate and cap 186 is adhered to the top of the polymer base 185 to protect the polymer base 184 from wear. Preferably, the cap 186 is formed of a relatively hard material, such as a diamond-like carbon. The relatively hard cap 186 prevents material loss for wear resistance of the shock pads. The relatively hard diamond-like carbon cap 186 provides a low friction interface for contact with the disc surface. Preferably, as shown, an upper surface 188 of the cap 186 is rounded to eliminate sharp edges to reduce damage to the disc surface via contact of the slider with the disc surface. The cap 186 may be rounded by a milling process. Alternatively, the cap 186 may be formed of such materials as Silicon, TiC or other metals. Thus, the shock pads illustrated in FIGS. 16–17 provide sufficient energy absorption for dampening shock which is relatively resistant to wear from contact with the disc surface.

Thus, shock pads of the present invention provide a more desirable contact interface between the disc surface and slider. The shock pads are designed to protect the disc media from contact with rough edges on the slider to provide shock protection for typical operating conditions. Although, in the embodiments shown, leading and trailing edge shock pads are shown, it should be understood that the invention is not limited to both leading and trailing edge shock pads and for example, a slider may include only trailing edge or leading edge shock pads. Thus, as described, the shock pads of the present invention protect a disc drive under shock and/or load and unload conditions.

What is claimed is:

1. A disc storage system comprising:

a base;

a disc rotationally coupled to the base and having a disc surface;

a disc head operably supported relative to the disc surface for operation, said disc head including;

at least one transducer element; and a slider supporting the at least one transducer element and including a bearing facing the disc surface for operation, the bearing including at least one raised bearing surface and at least one recessed bearing surface recessed from the at least one raised bearing surface and a portion of the at least one recessed bearing surface including contact members formed of an energy absorbent polymer material extending from the at least one recessed bearing surface of the slider to an elevation aligned with or below the at least one raised bearing surface and spaced from and non-contiguous with the at least one raised bearing surface to provide an energy absorbent contact interface between the disc surface and the slider.

2. The disc storage system of claim 1 wherein the slider includes corners and the contact members are positioned at the corners of the slider.

3. The disc storage system of claim 1 wherein the contact members are positioned at a leading edge of the slider.

4. The disc storage system of claim 1 wherein the contact members are positioned at a trailing edge of the slider.

5. The disc storage system of claim 1 wherein the contact members have rounded edges.

6. The disc storage system of claim 1 wherein the contact members are formed of a semicrystalline polymer material.

7. The disc storage system of claim 1 wherein the contact members are formed from a substrate forming the slider.

8. The disc storage system of claim 1 wherein the contact members extend to an elevation 0.1–0.3 μm below the at least one missed bearing surface.

9. A slider adapted to support a transducer element for operation in a data storage device, the slider comprising:

a base having a leading edge and a trailing edge and at least one recessed bearing surface and at least one raised bearing surface; and energy absorbent polymer contact means on the at least one recessed bearing surface for providing an energy absorbent contact interface between the slider and a disc surface.

10. The slider of claim 9 wherein the contact means comprises:

pads formed of a member extending above the at least one recessed bearing surface of the slider to an elevation aligned with or below the at least one raised bearing surface.

11. The slider of claim 10 wherein the pads are located at the leading edge of the slider.

12. The slider of claim 10 wherein the pads are located at the trailing edge of the slider.

13. The slider of claim 10 wherein the pads extend to an elevation 0.1–0.3 μm below the at least one raised bearing surface.

14. The slider of claim 10 wherein the pads are formed of a semicrystalline polymer material.

15. The slider of claim 10 wherein the slider includes corners and the pads are located at the corners of the slider.

16. A slider comprising:

at least one air bearing including at least one recessed bearing surface and at least one raised bearing surface and a plurality of slider corners having at least one corner of the slider contacting a recording surface during roll or pitch; and pad means, composed of an energy absorbing polymer material formed on the at least one recessed bearing surface, located at the at least one corner that contacts the recording surface during roll or pitch for preventing contact between the at least one corner and said recording surface and for absorbing the contact energy between the slider and the recording surface during contact caused by roll or pitch.

* * * * *